United States Patent
Sastry et al.

(10) Patent No.: US 6,694,373 B1
(45) Date of Patent: Feb. 17, 2004

(54) METHOD AND APPARATUS FOR HITLESS SWITCHOVER OF A VOICE CONNECTION IN A VOICE PROCESSING MODULE

(75) Inventors: Ramesh Sastry, Los Gatos, CA (US); Rangaraju Iyengar, Los Altos, CA (US); Kirk Sanders, San Jose, CA (US); Raffaello Pardini, San Jose, CA (US); Wing Chau, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 711 days.

(21) Appl. No.: 09/609,573

(22) Filed: Jun. 30, 2000

(51) Int. Cl.[7] .............................................. G06F 15/173
(52) U.S. Cl. ...................... 709/238; 709/200; 709/203; 709/223; 709/232; 709/239; 709/105; 370/282; 370/217; 714/10; 714/11
(58) Field of Search ................................. 709/200–203, 709/223–224, 231–232, 238–242, 105; 370/216–221, 282; 714/10–13

(56) References Cited

U.S. PATENT DOCUMENTS

| | | | | |
|---|---|---|---|---|
| 5,406,548 A | * | 4/1995 | Itoh et al. ..................... | 370/221 |
| 5,487,149 A | * | 1/1996 | Sung ............................ | 714/10 |
| 5,793,764 A | * | 8/1998 | Bartoldus et al. ........... | 370/390 |
| 5,912,888 A | | 6/1999 | Walsh et al. ................. | 370/355 |
| 6,169,726 B1 | * | 1/2001 | Dempsey et al. ............ | 370/219 |
| 6,272,522 B1 | * | 8/2001 | Lin et al. ..................... | 709/200 |
| 6,418,540 B1 | * | 7/2002 | Dempsey et al. ............ | 714/13 |
| 6,590,864 B1 | * | 7/2003 | Suzuki ......................... | 370/225 |
| 6,606,643 B1 | * | 8/2003 | Emens et al. ................ | 709/203 |

OTHER PUBLICATIONS

"Cisco AS5300 Voice–over–IP Feature Card Installation and Configuration," printed from Cisco website at cisco.com Feb. 22, 2000, 35 pages.

* cited by examiner

*Primary Examiner*—Bharat Barot
(74) *Attorney, Agent, or Firm*—Blakely, Sokoloff, Taylor & Zafman LLP

(57) ABSTRACT

A method and apparatus is described that provides for switching active data connections from one processor to another processor without significantly interfering with the transmission of the data. The data may be voice calls and the processors may be DSPs residing on a voice processing module. A DSP resource allocation algorithm may be used to load share the data by selectively moving an active voice call currently being processed on one DSP to another DSP having sufficiently available processing power, without interrupting the prevailing service. The liberated DSP may then be used to process a new active voice call. By using the DSPs to load share, the number of simultaneous active voice calls supported by a voice processing module may be increased.

27 Claims, 8 Drawing Sheets

METHOD AND APPARATUS FOR HITLESS SWITCHOVER OF A VOICE CONNECTION IN A VOICE PROCESSING MODULE

FIELD OF THE INVENTION

This invention relates to the field of networks and, more specifically, to the switching connections in networks.

BACKGROUND

Networks may contain a collection of clients that are interconnected by transmission lines to enable the transfer of data between them. Data is typically transmitted in the form of packets that are made up of smaller data cells. Packets include an address field that specifies the destination for which the data is intended. A network typically includes multiple access points (e.g., servers) that may switch and/or route packets between transmission lines to regulate data traffic between clients on the network. A network that is based on packet switching uses a network layer that defines an official packet format and protocol called IP (Internet Protocol). This type of network is referred to as an IP network.

A server on the network may have a controller and a switch that facilitate the movement of data passed through the server. When data arrives on an incoming transmission line, the switch must choose an outgoing line on which to forward the data based on its packet address field. Servers may also be used to connect different types of networks together. For example, one type of data that may be carried on a network is voice data. At one time, voice data was exclusively carried on a Public Switched Telephone Network (PSTN) using a copper wire transmission line that connected multiple clients through the PSTN to a central office.

Later, other types of networks were developed using higher bandwidth transmission lines that enabled greater amounts of data to be transmitted over a given time. For example, some companies use a private branch exchange network (PBX) having higher bandwidth transmission lines such as T1/E1, T3/E3, or fiber physical interfaces. A PBX uses service modules at network access points to facilitate the transmission of data, such a voice, over the network.

Voice processing modules are particular types of service modules used at network access points that connect to the PBX through transmission lines. These voice processing modules include a pool of Digital Signal Processors (DSP) to perform various voice processing functions to handle multiple voice calls that may be active in the network. Voice processing functions may include, for examples, adaptive differential pulse code modulation (ADPCM) and voice compression (e.g., CS-ACELP). ADPCM utilizes an algorithm by which analog voice samples are encoded into high quality digital signals. Voice compression is a process using algorithms such as Conjugated Structure Algebraic Code-Excited Linear Prediction (CS-ACELP) to compress a data stream into a smaller file for transmission over a network.

FIG. 1 illustrates one prior voice processing allocation scheme. A voice processing module may include multiple DSPs to perform various voice processing functions on voice calls. The algorithms for the various voice processing functions, however, may require different amounts of DSP processing power measured in millions of instructions per second (MIPS). For example, a voice compression algorithm, such as CS-ACELP, may perform more MIPS and, thus, may require much more DSP processing power than an ADPCM algorithm.

Each voice processing function may be allocated to a DSP based on the available MIPS of a DSP at the time when a call comes in. For example, a voice processing module may have six DSPs with each DSP capable of processing ten ADPCM algorithms or one CS-ACELP algorithm. If twenty nine ADPCM algorithms are originally required to be processed, then DSP 1 may be allocated two ADPCM algorithms, DSP-2 may be allocated four ADPCM algorithms, DSP-3 may be allocated four ADPCM algorithms, DSP-4 may be allocated three ADPCM algorithms, DSP-5 may be allocated ten ADPCM algorithms, and DSP-6 may be allocated six ADPCM algorithms. As such, DSP-5 is at full capacity and the other DSPs have extra MIPS capacity.

One problem with such a voice processing scheme is that the initial allocation that is set up gets altered in a random fashion due to the asynchronous nature of voice call arrival and completion activity in the PBX. For example, if a new call comes in requiring a CS-ACELP algorithm (e.g., equivalent to approximately ten ADPCM algorithms) to be processed, then the voice processing module would not be able to process the algorithm because none of the DSP currently have the MIPS capacity to handle the new voice call. As such, no DSPs are available to process newly incoming voice calls that may need higher MIPS for running certain compression algorithms.

In addition, there may be one or more DSPs that are underutilized because they are processing, for example, fewer ADPCM algorithms than they can handle. This may prevent the achievement of the maximum number of simultaneous active voice calls that use different voice algorithms from operating on a voice processing module.

SUMMARY OF THE INVENTION

The present invention pertains to a method and apparatus for data management. In one embodiment, the method may include transmitting an active data from a first client to a second client through a first processor. The method may also include switching the transmission of the active data from the first processor to a second processor without significantly interfering with the active data. The switching may be substantially transparent to the first and the second clients.

In one embodiment, the apparatus may include a switch, a first processor to operate on a current active data transmission, a second processor to operate on the current active data transmission and a central processing unit. The central processing unit may be coupled to the switch and to the first and the second processors. The central processing unit may selectively couple the switch to the first and the second processors based on a first control signal. The current active data may be switched from the first processor to the second processor without significantly interfering with the current active data transmission.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

The method and apparatus described herein provides for switching active data connections from one processor to another processor without significantly interfering with the transmission of the data. In one embodiment, the data may be voice calls and the processors may be DSPs residing on a voice processing module. A DSP resource allocation algorithm may be used to load share the data by selectively moving an active voice call currently being processed on one DSP to another DSP, having sufficient processing power, without interrupting the prevailing service ("hitless"). The active voice call is switched over to a different DSP such that it is transparent to the clients initiating and receiving the voice call. The liberated DSP may be used to process a newly active voice call. Thus, at any point in time, the number of simultaneous active voice calls supported by a module may be increased.

Figure 1:
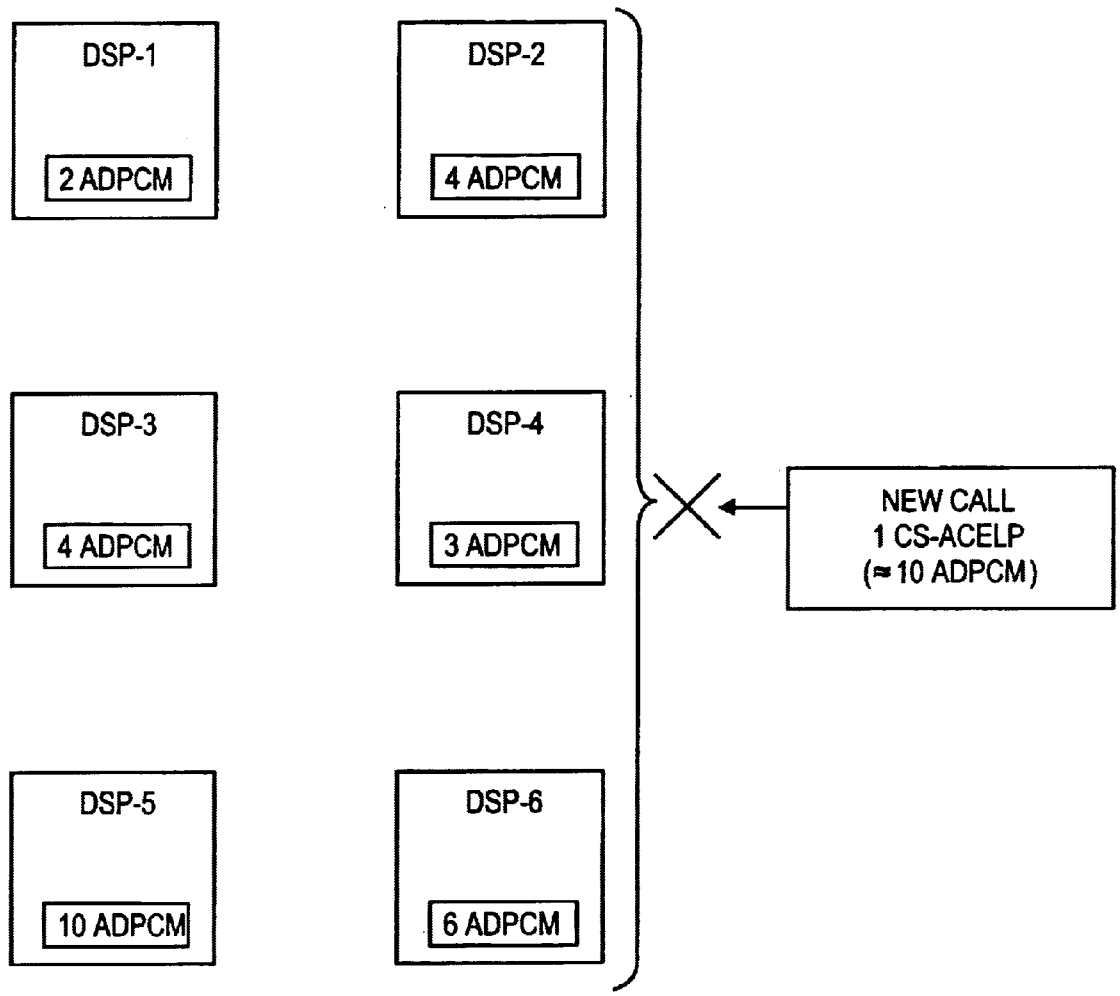
FIG. 1 illustrates one prior voice processing allocation scheme.
Figure 2:
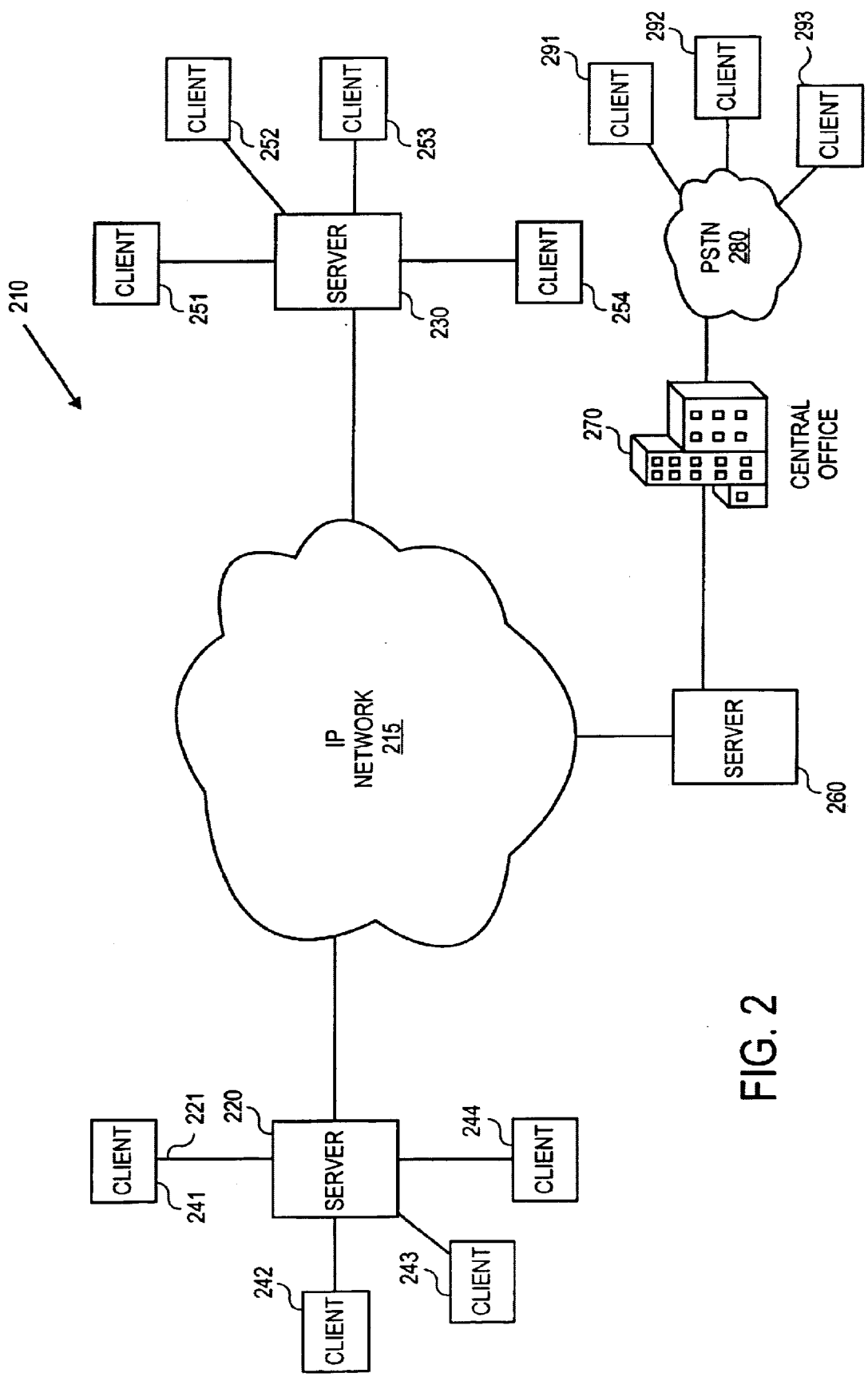
FIG. 2 illustrates one embodiment of a client-server system.

FIG. 2 illustrates one embodiment of a client-server system. In one embodiment, client-server system 210 may include one or more servers (e.g., servers 220 and 230) connected to IP network 215. Each server may be connected to one or more clients. For example, server 220 may be connected to clients 241–244 and server 230 may be connected to clients 251–254. Servers 220 and 230 operate to facilitate the transfer of data passed through them. When data arrives on an incoming transmission line (e.g., transmission line 221), server 220 must choose an outgoing path of IP network 215 on which to forward on the data. The movement of data over an IP network is well-known in the art; accordingly, a more detailed discussion is not provided.

Servers 220 and 230 may perform various functions in order to transfer data from one client (e.g., client 241) to another client (e.g., client 251) through IP network 215. In one embodiment, clients 241–244 and 251–252 may be customer premises equipment (CPE) and servers 220 and 230 may operate to transfer voice calls between clients over IP network 215. CPEs are terminating equipment, such as computers, terminals, telephones, and modems that may be used to connected to network 215. Servers 220 and 230 may include voice processing modules that perform various data processing functions to handle multiple data that may be active in the network. In another embodiment, servers 220 and 230 may operate to transfer other types of data between clients, for examples, text and images.

In one embodiment, server 260 may be used to connect other types of networks, utilizing other types of data devices, to IP network 215. For example, clients 291–293 may be telephones on a Public Switched Telephone Network (PSTN) 280. Voice calls between client telephones 291–293 are connected to PSTN 280 through a central office 270. Server 260 may be used to connect IP network 215 to central office 270 in order to transfer voice data between a client telephone (e.g., client telephone 291) and a client computer (e.g., client 251). Communications between a central office and telephone across a PSTN are well-known in the art; accordingly a more detailed discussion is not provided.

Figure 3:
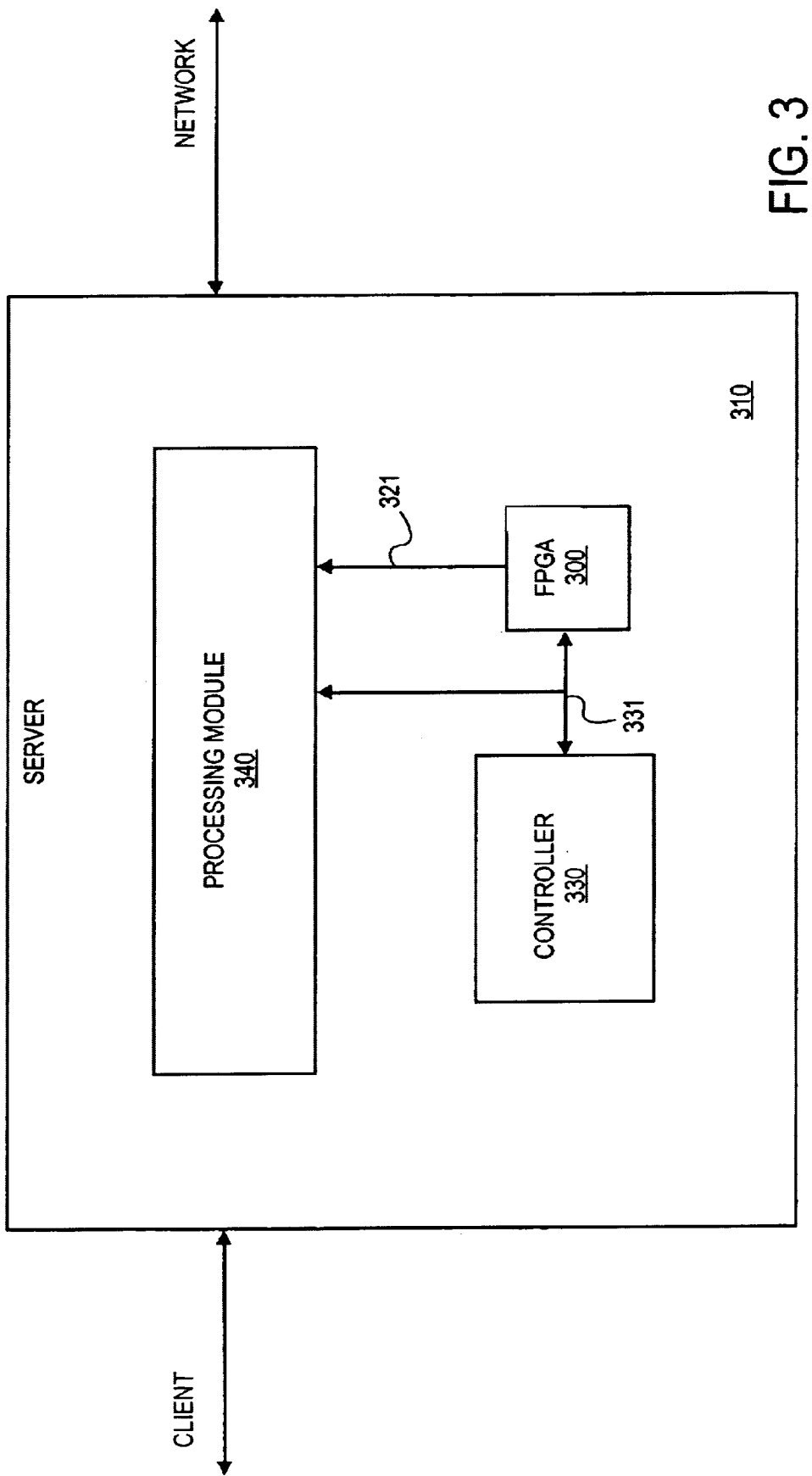
FIG. 3 illustrates one embodiment of a server.

FIG. 3 illustrates one embodiment of a server. In one embodiment, server 310 may be an implementation of servers 220, 230, and 260 of FIG. 2 and used to establish and maintain a data connection between different clients connected to the servers. Server 310 may include controller 330, processing module 340, and field programmable logic array (FPGA) 320.

Controller 330 is coupled to FPGA 320 and processing module 340 via control bus 331. FPGA 320 generates SWITCH signals on line 321, after receiving a command from controller 330. Controller 330 is used to control the data connection and data activity within server 310. In one embodiment, controller 330 may be a microprocessor, for example, a MIPS processor. In one embodiment, processing module 340, FPGA 320; and controller 320 may be located on different cards within server 310. In another embodiment, one or more of processing module 340, FPGA 320, and controller 320 may be located on the same card. A controller and a FPGA are well-known in the art; accordingly, a more detailed description of their internal operation is not provided.

In one embodiment, FPGA 320 is used to control, through state machines, the movement of data through processing module 340. Processing module 340 receives incoming data to server 310 and processes the data under the control of FPGA 320 and a CPU (not shown), as discussed in further detail below.

Figure 4:
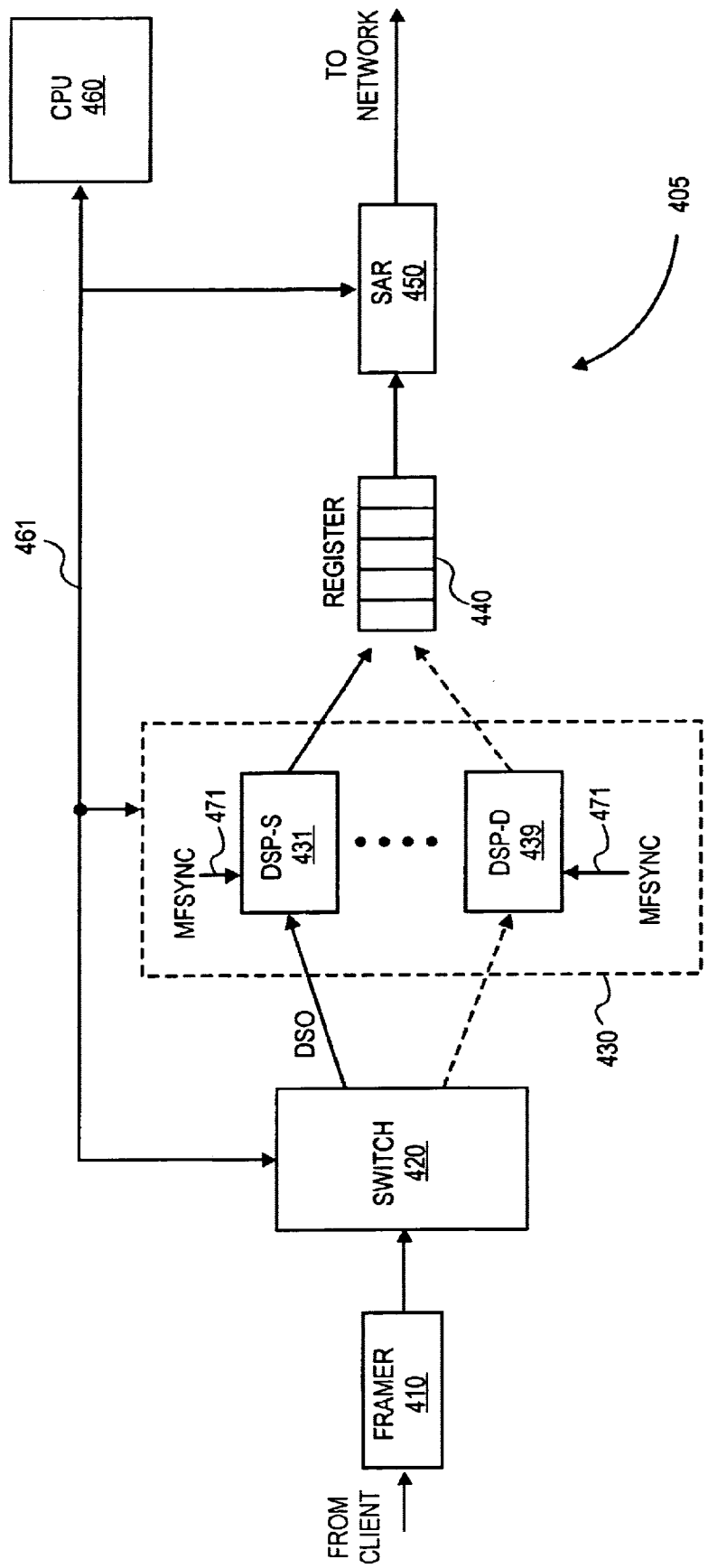
FIG. 4 illustrates one embodiment of a processing module operating on data outgoing from a client to a network.

FIG. 4 illustrates one embodiment of processing module 340 of FIG. 3 operating on data outgoing from a client to a network. Processing module 405 includes framer 410, switch 420, multiple DSPs 430, register 440, segment and reassembly component (SAR) 450, and central processing unit (CPU) 460. The processing module 450 receives incoming data ("ingress") transmitted from a client and processes the data for transmission over a network. The operation of the components on processing module 405 are controlled by CPU 460 through control bus 461. In one embodiment, CPU 460 includes a DSP resource allocation algorithm that may be used to load share data by selectively moving active data between two DSPs (e.g., from source DSP 431 to destination DSP 439) without significantly interrupting the prevailing data transmission.

Framer 410 provides logical grouping of information sent as a data link layer unit from a client to processing module 405. For example, the data may be framed by a header and trailer, that may be used for synchronization and error control, that surround the desired data contained in the data link layer unit. Framer 410 is coupled to switch 420 to transmit the framed data. Switch 420 allows a connection to be established through one of multiple DSPs 430 and terminates the connection when there is no longer a data transmission to support.

Multiple DSPs 430 perform various digital signal processing functions on data received from switch 420 and then transmit the data to register 440. In one embodiment, the movement of data to and from register 440 is controlled by control signal MFSYNC received from an FPGA (e.g., FPGA 320 of FIG. 3). Register 440, through the use of timing queues, operates to load data received from the DSPs 430 and unload data to SAR 450. In one embodiment, register 440 includes a first-in-first-out (FIFO) register and a queue buffer. SAR 450 operates to segment data (at a source processing module) transmitted out to a network and reassemble data (at a destination processing module) received from a network.

In one embodiment, processing module 405 may be a voice processing module that performs various voice processing functions to handle multiple voice calls that may be active in a network to which server 310 is connected. In an alternative embodiment, processing module 405 may be configured to operate on other types of data, for example, text and image.

Voice processing functions may include, for examples, ADPCM, voice compression (e.g., CS-ACELP and LDCELP), silence detection, and echo cancellation. When a voice call is received by processing module 405, the voice call is allocated to one of multiple DSPs 430 for processing. As additional voice calls are received by processing module 405, they are allocated to other DSPs of multiple DSPs 430 based on the available MIPS of the DSPs at the time when the voice call comes in.

In one embodiment, a new voice call may come in that may require a certain amount of processing power that is not available on any DSP of multiple DSPs 430 at that time. In such a situation, a pre-existing voice call currently operating on a DSP, for example source DSP (DSP-S) 431 may be moved to another DSP, for example, destination DSP (DSP-D) 439 that has the available processing power to handle the voice call to be moved. As a result, DSP-S 431 may be liberated to handle the new voice call.

In one embodiment, firmware within CPU 460 decides the destination DSP (e.g., DSP 439) to which the connection is moved from source DSP 431. SAR 450 may be programmed by CPU 460 to indicate that the targeted data connection (DSO) will be switched from source DSP 431 to destination DSP 439. After such programming by CPU 460, SAR 450 will reject all data cells coming from destination DSP 439 until the switching is completed. Switch 420 is programmed to multicast the DSO data on the destination DSP 439.

In multicasting, data received by switch 420 is transmitted to both the source DSP 431 and the destination DSP 439. In one embodiment, the new data connection established with destination DSP 439 is flushed with the multicast data for one or more frames to allow for meaningful data to be output from the destination DSP 439 due to factors such as compression algorithm convergence time. CPU 460 will complete the flushing cycle and then will program both source DSP 431 and destination DSP 439 to assert SWITCH flags in the immediate transmit data packets. The source and destination DSPs 431 and 439, respectively, may be programmed with MFSYNC interrupt line 471. In one embodiment, a time synchronized interrupt signal on line 471 is generated by a FPGA, for example, FPGA 320 of FIG. 3 connected to the processing module 405.

Figure 5:
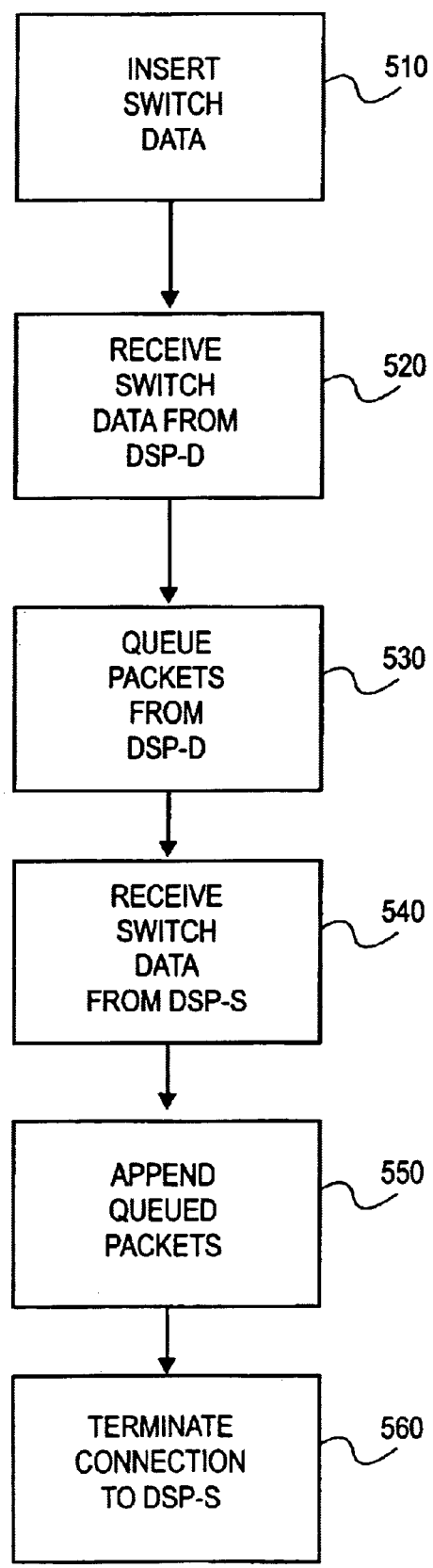
FIG. 5 is a flow chart illustrating one embodiment of data switching from a source DSP to a destination DSP in an outgoing processing module.

FIG. 5 is a flow chart illustrating one embodiment of data switching from a source DSP to a destination DSP in an outgoing processing module. Switch 420 establishes a connection to source DSP 431 through which data packets are transmitted to SAR 450. A SWITCH flag is inserted into the data packets, step 510, when a switch over to destination DSP 439 is desired, as discussed above. The DSPs 431–439 may be programmed to perform this tagging function. In one embodiment, if SAR 450 identifies the SWITCH flag in the data packets received from destination DSP 439, the SAR 450 will register the receipt of the SWITCH flag, step 520. When SAR 450 receives the SWITCH flag, the SAR will continue to receive packets from source DSP 431 until the SWITCH packet from the source DSP is received.

Packets from the destination DSP 439 will be queued in a queue buffer within register 440 separately from the main stream FIFO, step 540. When SAR 450 receives the SWITCH flag from the source DSP 431, step 540, the SAR will append the queued packets from queue buffer to the main stream FIFO of register 440, step 550. Switch 420 may then terminate the connection from source DSP 431, step 560. In an alternative embodiment, if the SWITCH flag is received from source DSP 431 before destination DSP 439, then buffering of the data packets may not be required. As such, by using a SWITCH signal and multicasting the data to both the source and destination DSPs, data processing may be transferred to a different DSP without significantly interrupting the prevailing data transmission to the client.

Figure 6:
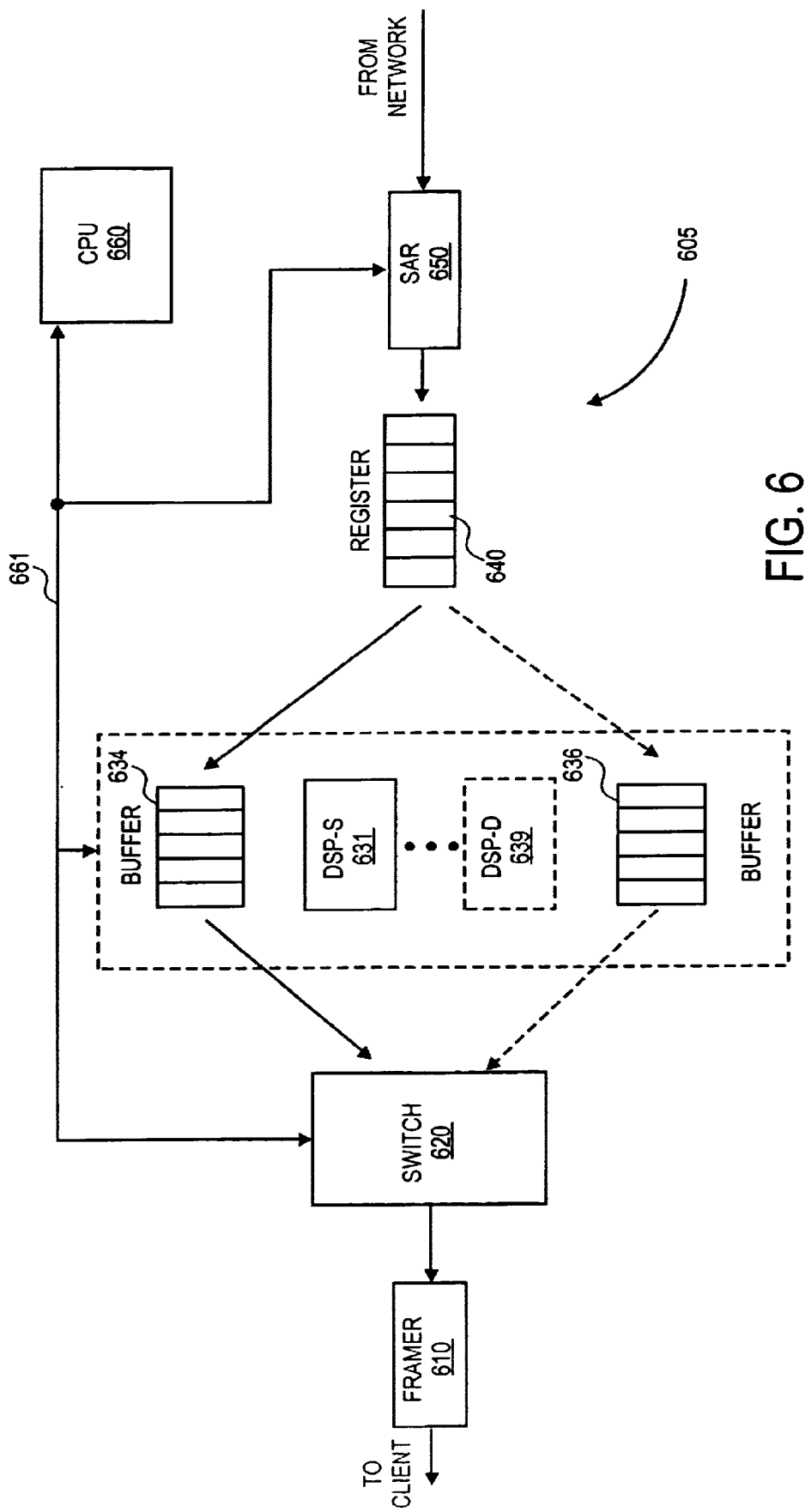
FIG. 6 illustrates one embodiment of processing module operating on data incoming from a network.

FIG. 6 illustrates one embodiment of processing module 340 of FIG. 3 operating on data incoming from a network. Processing module 605 includes framer 610, switch 620, multiple DSPs 630, register 640, SAR 650, control bus 661, and CPU 660 that are similar to the components described in FIG. 4. The processing module 650 receives incoming data ("egress") transmitted from a network and processes the data for transmission to a client.

Figure 7:
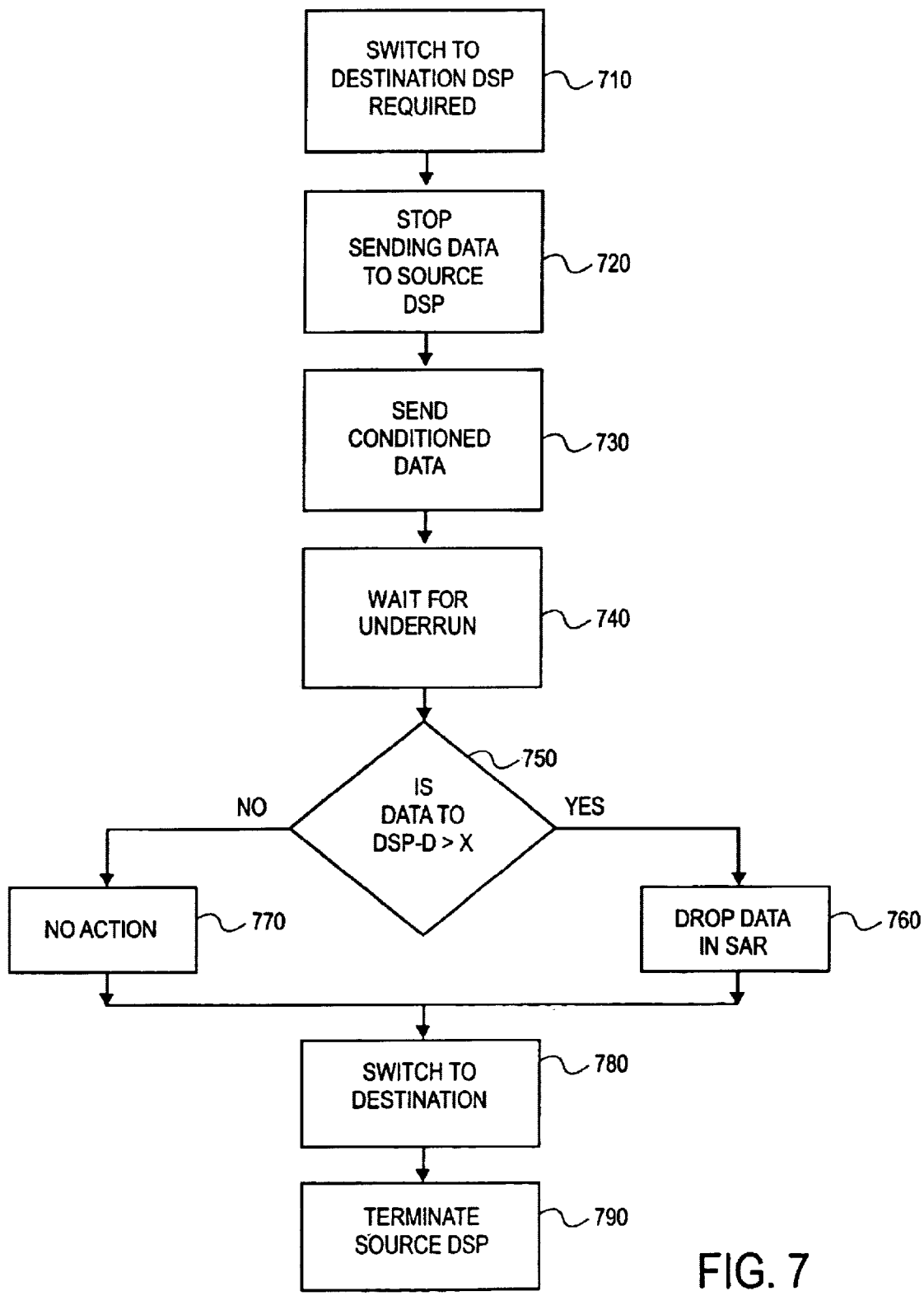
FIG. 7 is a flow chart illustrating one embodiment of data switching from a source DSP to a destination DSP in an incoming processing module.

FIG. 7 is a flow chart illustrating one embodiment of data switching from a source DSP to a destination DSP in an incoming processing module. When a switch over to a destination DSP 639 is required, step 710, SAR 650 will stop sending data packets to source DSP 631, step 720. In one embodiment, CPU 660 may instruct SAR 650 to send conditioned data until the switch signal is received, step 730. The conditioned data may be, for example, silent voice data that is used to flush out the destination DSP buffer before the actual voice data is transferred to the destination DSP so that unintended audible signals are not generated in the data transmission. The conditioned data may be less than or equal to the maximum number of data packets ("X") in buffer 636 because any number of data packets greater than the buffer maximum may be unnecessary. In an alternative embodiment, conditioned data is not sent to the DSPs. In this manner, voice data that is transmitted from one client to another client may be switched over to a different processor operating on the voice data such that the switch is substantially transparent to the clients.

Next, a time period is allowed to elapse for source DSP 631 to underrun, step 740. An underrun occurs when source DSP 631 exhausts all the data in its buffer 634 to switch 620. This condition provides an indication that a switch may occur. A determination is made whether, in this time period, the number of packets sent to destination DSP 639 is greater than or equal to maximum buffer size (X), step 750. If the number of packets sent to destination DSP 639 is greater than or equal to maximum buffer size (X), then SAR 650 may drop them, step 760. Otherwise, no action may be taken by SAR 650, step 770. Switch 620 may then switch to receive data from destination DSP 639, step 780, and CPU 660 instructs destination DSP 639 to transmit the desired data from the buffer. The CPU may then instruct source DSP 631 to terminate data transmission, step 790.

Figure 8:
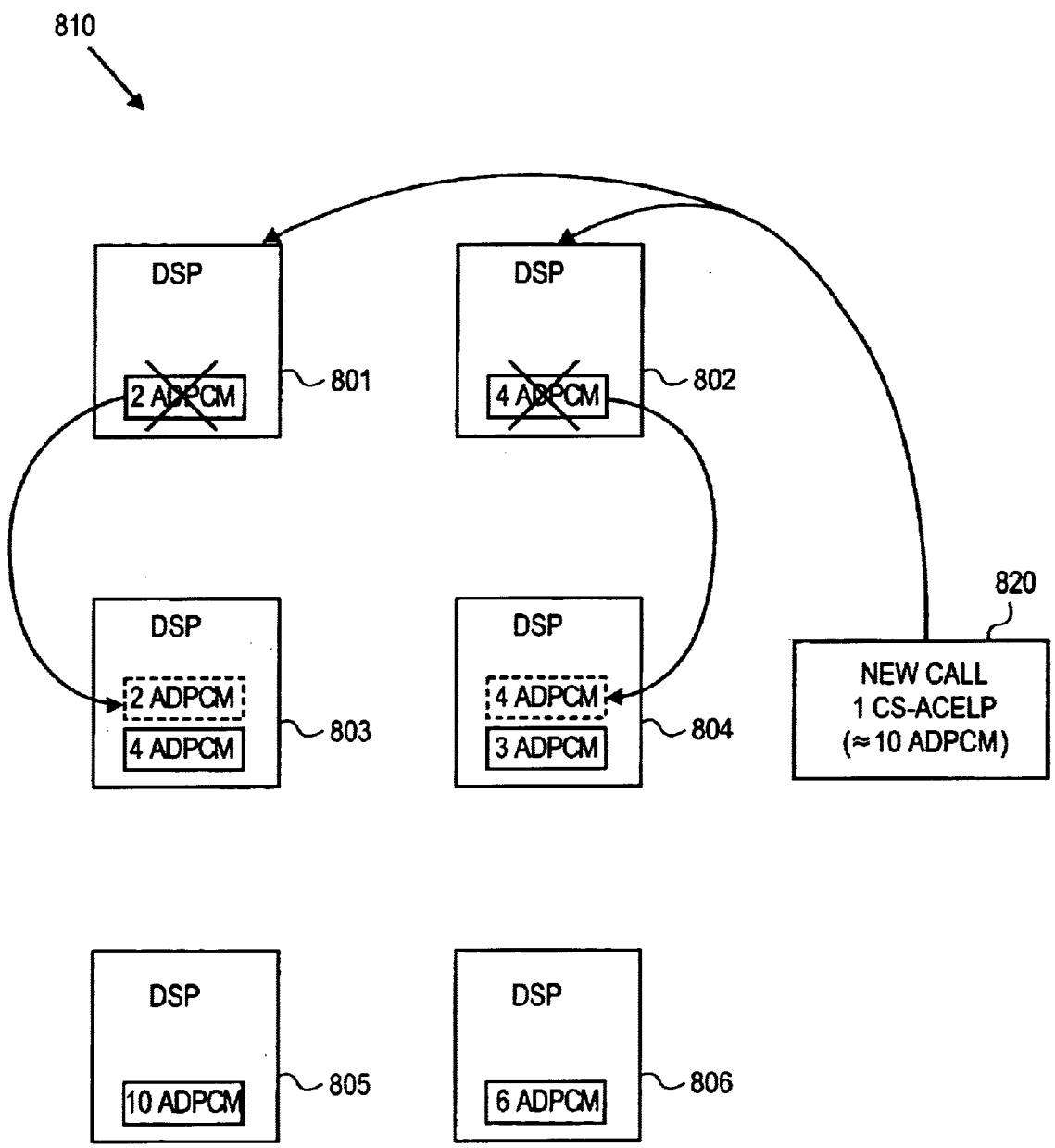
FIG. 8 is a conceptual illustration of data switching between DSPs.

FIG. 8 is a conceptual illustration of data switching between DSPs. For example, voice processing module 810 may include 6 DSPs 801–806 with each DSP capable of processing 10 ADPCM algorithms or 1 CS-ACELP algorithm. If 29 ADPCM algorithms are originally required to be processed, then DSP 801 may be allocated two ADPCM algorithms, DSP 802 may be allocated 4 ADPCM algorithms, DSP 803 may be allocated 4 ADPCM algorithms, DSP 804 may be allocated 3 ADPCM algorithms, DSP 805 may be allocated 10 ADPCM algorithms, and DSP 806 may be allocated 6 ADPCM algorithms. As such, DSP 805 is at full capacity and the DSPs 801–804 and 806 have extra MIPS capacity.

If a new voice data 820 comes in requiring a CS-ACELP algorithm (e.g., equivalent to approximately 10 ADPCM algorithms) to be processed, then the method and apparatus described herein may be used to selectively move active voice data from, for example, DSP 801 to DSP 803 in order to free up DSP 801 to handle the new voice data. Thus, at any point in time, by using the DSPs to load share, the number of simultaneous active voice calls supported by a processing module may be increased. In addition, the number of calls supported for each voice processing unit may be dynamically allocated based on the incoming call type.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A module, comprising:
   a switch;
   a first processor to operate on a current active data transmission,
   a second processor to operate on the current active data transmission; and
   a central processing unit coupled to the switch and to the first and the second processors, the central processing unit to selectively couple the switch to the first and the second processors based on a first control signal, the current active data being switched from the first processor to the second processor without significantly interfering with the current active data transmission.

2. The module of claim 1, further comprising:
   a segment and reassembly component coupled to the central processing unit, the segment and reassembly component to segment the current active data; and
   a register coupled to the segment and reassembly component, the register selectively coupleable to the first and the second processor, the register to load the current active data from the first and the second processors and unload the current active data to the segment and reassembly component.

3. The module of claim 2, further comprising a framer coupled to the switch.

4. The module of claim 3, wherein the first and the second processors are configured to move the current active data to and from the register based on a second control signal.

5. The module of claim 4, wherein the register includes a FIFO.

6. The module of claim 2, wherein the second processor has at least a first amount of available processing capability and wherein the current active data requires the first amount of processing capability.

7. The module of claim 6, wherein the first processors is configured to receive a new active data after the current active data is switched from the first processor to the second processor.

8. The module of claim 7, wherein the first and the second processors are digital signal processors.

9. The module of claim 8, wherein the current active data is voice call data.

10. A server, comprising:
    a controller;
    a field programmable gate array coupled to the controller; and
    a processing module coupled to the controller and the field programmable gate array, the processing module comprising:
    a switch;
    a first processor to operate on a current active data transmission,
    a second processor to operate on the current active data transmission; and
    a central processing unit coupled to the switch and to the first and the second processors, the central processing unit to selectively couple the switch to the first and the second processors based on a first control signal, the current active data being switched from the first processor to the second processor without significantly interfering with the current active data transmission.

11. The server of claim 10, wherein the processing module further comprises:
    a segment and reassembly component coupled to the central processing unit, the segment and reassembly component to segment the current active data;
    a register coupled to the segment and reassembly component, the register selectively coupleable to the first and the second processor, the register to load the current active data from the first and the second processors and unload the current active data to the segment and reassembly component; and
    a framer coupled to the switch.

12. The server of claim 11, wherein the first and the second processors are configured to move the current active data to and from the register based on a second control signal and wherein the first processors is configured to receive a new active data after the current active data is switched from the first processor to the second processor.

13. A client-server system, comprising:
    a first client;
    a second client;
    a first server coupled to the first client;
    a network coupled to the first server;
    a second server coupled to the network and to the second client, the second server comprising:
    a controller;
    a field programmable gate array coupled to the controller; and
    a processing module coupled to the controller and the field programmable gate array, the processing module comprising:
    a switch;
    a first processor to operate on a current active data transmission,
    a second processor to operate on the current active data transmission; and
    a central processing unit coupled to the switch and to the first and the second processors, the central processing unit to selectively couple the switch to the first and the second processors based on a first control signal, the current active data being switched from the first processor to the second processor without significantly interfering with the current active data transmission.

14. The client-server system of claim 13, wherein the first and the second processors are configured to move the current active data to and from the register based on a second control signal and wherein the first processors is configured to receive a new active data after the current active data is switched from the first processor to the second processor.

15. A method of data management, comprising:

transmitting an active data from a first client to a second client through a first processor; and switching the transmission of the active data from the first processor to a second processor without significantly interfering with the active data, the switching being substantially transparent to the first and the second clients.

16. The method of claim 15, wherein switching the active data comprises:

inserting a switch signal into the active data;

receiving the switch signal by the second processor;

receiving the switch signal by the first processor; and transmitting the active data through the second processor based on receipt of the switch signal by the first and the second processors.

17. The method of claim 16, wherein switching the active data further comprises:

buffering part of the active data; and terminating the transmitting of the active data to the first processor after the active data is transmitting through the second processor.

18. The method of claim 15, wherein switching the active data comprises:

terminating the transmission of active data to the first processor;

transmitting conditioned data to the second processor;

transmitting the active data through the second processor; and terminating the transmission of data through the first processor.

19. The method of claim 18, wherein the active data is voice data and wherein the conditioned data is silence.

20. A method of allocating processing power, comprising:

using a plurality of processors to operate on a plurality of currently active data, each of the plurality of processors having a predetermined amount of processing capability, each of the plurality of processors using a first portion of the predetermined amount of processing capability to operate on the plurality of currently active data, each of the plurality of processors having a remaining portion of processing capability;

receiving a new active data;

switching one of the plurality of currently active data to a different processor from a first processor on which the currently active data is operating, without significantly interfering with the transmission of the plurality of currently active data; and using the first processor to operate on the new active data.

21. The method of claim 20, wherein the new active data requires an amount of processing capability greater than any of the remaining portion of processing capability of the plurality of processors.

22. The method of claim 21, wherein the currently active data and the newly active data comprise voice data.

23. The method of claim 20, further comprising:

receiving the one of the plurality of currently active data from a first client; and transmitting the one of the plurality of currently active data to a second client, the switching being substantially transparent to the first and the second clients.

24. The method of claim 23, further comprising transmitting condition data to the first processor prior to the switching.

25. An apparatus for performing data management, comprising:

means for transmitting an active data from a first client to a second client through a first processor; and means for switching the transmission of the active data from the first processor to a second processor without significantly interfering with the active data, the switching being substantially transparent to the first and the second clients.

26. The apparatus of claim 25, wherein switching the active data comprises transmitting the active data through the second processor based on receipt of the switch signal by the first and the second processors.

27. The apparatus of claim 26, wherein switching the active data further comprises terminating the transmitting of the active data to the first processor after the active data is transmitting through the second processor.

* * * * *